US012560192B2

(12) United States Patent
Junggebauer et al.

(10) Patent No.: US 12,560,192 B2
(45) Date of Patent: Feb. 24, 2026

(54) FASTENING ARRANGEMENT

(71) Applicant: Volkswagen Aktiengesellschaft, Wolfsburg (DE)

(72) Inventors: Jens Junggebauer, Braunschweig (DE); Nils Gwiasda, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 500 days.

(21) Appl. No.: 18/082,030

(22) Filed: Dec. 15, 2022

(65) Prior Publication Data
US 2023/0193939 A1 Jun. 22, 2023

(30) Foreign Application Priority Data

Dec. 21, 2021 (DE) ..................... 10 2021 214 752.6

(51) Int. Cl.
| | |
|---|---|
| *F16B 21/04* | (2006.01) |
| *B60S 1/04* | (2006.01) |
| *F16B 5/02* | (2006.01) |
| *F16B 5/06* | (2006.01) |
| *F16B 5/10* | (2006.01) |

(52) U.S. Cl.
CPC ............ *F16B 21/04* (2013.01); *B60S 1/0444* (2013.01); *B60S 1/0447* (2013.01); *F16B 5/0258* (2013.01); *F16B 5/10* (2013.01); *F16B 2005/0671* (2013.01); *Y10T 403/7007* (2015.01)

(58) Field of Classification Search
CPC ...... B60S 1/0444; B60S 1/0447; B62D 27/04; B62D 27/06; F16B 5/0241; F16B 5/025;
(Continued)

(56) References Cited

U.S. PATENT DOCUMENTS

| | | | | |
|---|---|---|---|---|
| 4,716,633 A | * | 1/1988 | Rizo .................... | B60R 13/0206 |
| | | | | 24/297 |
| 6,354,578 B1 | * | 3/2002 | Nakatsukasa ......... | F16F 1/3735 |
| | | | | 267/293 |

(Continued)

FOREIGN PATENT DOCUMENTS

| | | | | |
|---|---|---|---|---|
| DE | 19916098 A1 | * | 10/2000 | ............ F16B 5/0258 |
| DE | 202013004139 U1 | | 4/2014 | |

(Continued)

*Primary Examiner* — Josh Skroupa
(74) *Attorney, Agent, or Firm* — Muncy, Geissler, Olds & Lowe, P.C.

(57) ABSTRACT

A fastening arrangement having a fastening element for elastically connecting a bolt-on part to a support part. The fastening element has a head section (7) that transitions into an element shank. An elastomer profile part with a retaining groove which is open radially to the outside, into which a retaining foot of the bolt-on part can engage, is arranged on the underside of the head section. The retaining groove is designed with a groove wall on the head side and a groove wall on the shank side. The elastomer profile part is constructed in at least two parts from an elastomer body arranged on the head section of the fastening element and from a disk element that has at least the shank-side groove wall of the retaining groove. The disk element is also composed of two components, namely the elastomer profile part and the hard component.

10 Claims, 8 Drawing Sheets

(58) Field of Classification Search
CPC .......... F16B 5/0258; F16B 5/10; F16B 21/02;
F16B 21/04; F16B 21/09; F16B
2005/0674; F16B 2005/0671; F16F
1/3735; Y10T 403/7005; Y10T 403/7007;
Y10T 403/7015
USPC ........................................ 403/348, 349, 353
See application file for complete search history.

(56) References Cited

U.S. PATENT DOCUMENTS

| | | | | |
|---|---|---|---|---|
| 6,719,482 | B2 * | 4/2004 | Morita ................. | F16B 5/0258 |
| | | | | 403/408.1 |
| 9,205,875 | B2 | 12/2015 | Calisoglu et al. | |
| 9,482,257 | B2 * | 11/2016 | Junggebauer ........... | F16B 21/04 |

FOREIGN PATENT DOCUMENTS

| | | | | | |
|---|---|---|---|---|---|
| DE | 202013007579 | U1 | 12/2014 | | |
| DE | 102013011878 | A1 | 1/2015 | | |
| DE | 102017116057 | A1 * | 1/2019 | ........... | F16B 5/0258 |
| EP | 0950586 | A2 | 10/1999 | | |
| EP | 1070823 | A2 * | 1/2001 | .......... | E06B 3/5436 |
| EP | 3736464 | A1 * | 11/2020 | ........... | F16F 1/3735 |
| FR | 2738853 | A1 * | 3/1997 | ........... | F16B 5/0258 |
| JP | 2019190647 | A | 10/2019 | | |
| WO | WO03051690 | A1 | 6/2003 | | |
| WO | WO-2010034486 | A1 * | 4/2010 | ............. | F16B 21/08 |
| WO | WO 2017144570 | A1 | 8/2017 | | |

* cited by examiner

FASTENING ARRANGEMENT

This nonprovisional application claims priority under 35 U.S.C. § 119(a) to German Patent Application No. 10 2021 214 752.6, which was filed in Germany on Dec. 21, 2021, and which is herein incorporated by reference.

BACKGROUND OF THE INVENTION

Field of the Invention

The invention relates to a fastening arrangement having a fastening element.

Description of the Background Art

A generic fastening arrangement is known from DE 10 2013 011 878 A1, which is incorporated herein by reference. The fastening arrangement has a fastening element by means of which a windshield wiper motor or the like can be elastically connected as a bolt-on part to a body panel of a vehicle. The fastening element, made of plastic, has an enlarged head section that transitions into an element shank. Arranged on the underside of the head section is an elastomer profile part with a retaining groove that is open radially to the outside. A retaining foot of a bolt-on part can engage in the retaining groove of the elastomer profile part of the fastening element. The retaining groove formed in the elastomer profile part has a groove wall on the head side, a groove wall on the shank side, as well as a radially inner groove bottom.

In the conventional art, in a preassembly process, in which a fastening element is preassembled on the retaining foot of the bolt-on part, typically takes place in a supplier plant. Subsequently, the modular unit composed of bolt-on part with fastening element is transferred to the vehicle manufacturing plant where a final assembly process is carried out. In the final assembly process, the element shank of the fastening element is passed through a mounting hole of the panel into a final assembly position. In the final assembly position, the head section presses the elastomer profile part against the panel, creating an elastic preloading so that the retaining foot of the bolt-on part engaging in the elastomer profile part is elastically preloaded in the axial direction.

In the conventional art, the elastomer profile part may be made of a single material and as a single piece from an elastomer material. The groove width of the retaining groove formed in the elastomer profile part is dimensioned such that the retaining foot is brought into engagement with the retaining groove, creating an elastic preloading, as early as the preassembly process. Owing to the design of the elastomer profile part from a single material and as a single piece, therefore, the preassembly process proves to be complex from a production standpoint, among other issues. Moreover, it is customary practice in the prior art to use multiple elements for fastening.

SUMMARY OF THE INVENTION

It is therefore an object of the present invention to provide a fastening arrangement having a fastening element for elastically connecting a bolt-on part to a panel, by means of which a preassembly process and/or a final assembly process for assembling the bolt-on part on the panel is simplified.

The invention is based on a fastening arrangement having a fastening element with which a bolt-on part can be elastically connected to a support, for example a panel or the like. The fastening element has a head section that transitions into an element shank. Arranged on the underside of the head section is an elastomer profile part with a retaining groove that is open radially to the outside. A retaining foot of a bolt-on part can engage in the retaining groove of the elastomer profile part. In customary practice, a preassembly process in which the fastening element is preassembled on the retaining foot of the bolt-on part is carried out, for example in a supplier plant. Subsequently, the modular unit formed of the bolt-on part and the fastening element can be transferred to a vehicle manufacturing plant where a final assembly process takes place. In the final assembly process, the element shank of the fastening element is passed through a mounting hole of the panel into a final assembly position. In the final assembly position, the head section presses the elastomer profile part against the panel, creating an elastic preloading. In this way, the retaining foot of the bolt-on part is elastically preloaded in the axial direction. Thus, the elastomer profile part is no longer made of a single material and as a single piece, but instead is constructed in at least two parts from an elastomer body arranged on the head section of the fastening element and from a disk element. The disk element has at least one groove wall on the shank side of the retaining groove. Furthermore, the disk element is supported on the element shank by means of an axial guide so as to be movable through an axial motion clearance. As will be described later, the disk element can be composed of two materials. The disk element can be moved easily in an axial direction, thus simplifying the preassembly process, by means of the axial guide. A groove width of the retaining groove formed in the elastomer profile part can be varied easily by means of the axial guide, so that the retaining foot of the bolt-on part can be brought into engagement with the retaining groove of the elastomer profile part during the preassembly process without creating stress.

In the invention, the following process sequence is taken as a starting point: In a first phase, production of the principal part (for example, a wiper motor or other drives or control units) takes place, as well as separate production of the fastening element (or clip element) according to the invention. In a second phase, a preassembly takes place in which the fastening element is attached to a retaining foot of the principal part. As a result, a ready-to-install assembly is produced, for example at the supplier's facility. The disk element according to the invention can still move axially on the clip element. There is no preloading on the elastomer components yet. Moreover, a preliminary latching is created. The fastening element is on the retaining foot of the principal part (or bolt-on part) by a gentle latching of the disk element to the fastening element by means of a retaining device, preferably a groove-and-rib geometry. The groove is designed to be wide in order to permit an axial shifting of the rib. In a third phase, a transport takes place of the ready-to-install assembly from the supplier to the assembly lines of the vehicle manufacturer. In a fourth phase, final assembly takes place with an installation of the ready-to-install assembly on a support part (or directly on a car body or on a composite part) on the vehicle on the assembly line. The contact or final preloading on the elastomer components is created and remains.

The entire part according to the invention, formed of the fastening element and the disk element, provides technical capabilities for overcoming or mitigating the disadvantages of the prior art. Essentially, the idea includes the combination of two-component parts (which is to say fastening element and disk element), which interlock in a particular manner and can be preassembled on the principal part. The preassembly preferably takes place in the manner that the clip element is first attached to the retaining foot of the bolt-on part, and after that the disk element is pushed onto the clip element. The pushing can be accomplished manually, but preferably by automated means. After the disk element has been pushed on, it is still axially movable on the clip element. This results in easier adaptability to the surroundings as well as robustness during assembly and transport.

An essential concept of the invention is in the combination of two parts, namely the fastening element and the disk element, the two of which can be implemented as two-component parts and interlock in a particular manner and hold onto the retaining foot of the bolt-on part in all the above-mentioned phases, and can also retain and damp this principal part itself from the fourth phase onward. The disk element is axially movable on the fastening element prior to final installation of the bolt-on part (which is to say in the so-called "as-delivered condition"=ready to install). The technical interplay of these two two-component parts after final installation is variable through appropriate design. This results in easier adaptability to the surroundings, to the requirements, and also greater robustness. Each of the two elements is formed of a hard component and an elastomer component.

An important feature/advantage is in the ability of the disk element to slide along the longitudinal axis of the fastening element in the preassembled state. The desired preloading or the contact of the elastomer regions (of the fastening element and of the disk element) on or with the support part and the retaining foot is created during the final assembly of the bolt-on part on the support part (i.e., in the fourth phase). The ability of the disk element to move axially on the clip element provides for a reliable assembly process as well as trouble-free transportation and handling up to final assembly.

In a structurally simple variant embodiment, the axial guide of the disk element is designed as follows: At least one axial rib can thus project from the inner perimeter of the disk element. The axial rib interacts with an axial groove, located in the groove bottom of the retaining groove, in which the axial rib of the disk element is guided so as to be axially movable but rotationally fixed. In a simple embodiment, the axial groove can be designed as a discontinuity in the elastomer material of the elastomer body.

The creation of a predefined clamping force (described later) between the fastening element and the panel has relevance for a stable clamped connection (described later) of the fastening element to the panel. Against this background, the axial groove located in the groove bottom of the retaining groove of the elastomer profile part can terminate on the head side with an axial stop. In the final assembly process, this axial stop limits an axial movement of the disk element toward the head section. As a result, a pushing motion of the fastening element in the mounting hole of the panel is also limited during the final assembly process.

The disk element can be secured on the fastening element by a retaining device that is releasable without tools. In this way, the fastening element together with the disk element can be kept available as a modular unit even before performance of the preassembly process. It is structurally simple when the retaining device has mutually cooperating, interlocking, complementary members, which are formed on both the inner perimeter of the disk element and the outer perimeter of the element shank. By way of example, the interlocking, complementary members can be an axial groove formed on the outer perimeter of the element shank and a preliminary latching rib that is formed on the inner perimeter of the disk element and projects into the axial groove.

For stable support of the fastening element on the panel, it is preferred when the disk element is designed as a two-component part. In this case, the groove wall made of elastomer material on the shank side can constitute a soft component. In addition, the disk element can have a hard component that faces the shank tip and is supported over a large area on the edge region of the opening of the panel in the final assembled state.

The fastening element can be fastened to the panel in different ways during the final assembly process. It is simple from a production standpoint when the fastening element has, in the region of the shank tip of the element shank, at least one mounting boss that projects radially outward from the element shank. The final assembly process can be carried out by means of a push/rotate actuation in this case. For this purpose, the fastening element is first passed through the mounting hole of the panel in the pushing direction. Subsequently, a rotary actuation takes place in which the fastening element is rotated into the final assembly position. The mounting boss engages beneath an edge region of the opening of the panel in the final assembly position. In addition, in the final assembly position, the edge region of the opening of the panel is clamped between the disk element and an upper side of the mounting boss by the axial preloading that has been created.

Stable clamping of the edge region of the opening of the mounting hole of the panel between the disk element and the upper side of the mounting boss is of great importance for operationally reliable support of the bolt-on part. Against this background, the geometry of the axial rib can be designed as follows: In the final assembly position, the axial rib of the disk element can thus be guided into pressure contact with the axial stop of the fastening element, using up the axial clearance of motion. The disk element is therefore supported on the axial stop of the fastening element by its axial rib, by which means the disk element can press the panel against the upper side of the mounting boss with a predefined clamping force.

On account of the two-piece design according to the invention of the elastomer profile part, the disk element can be slid axially at any time to simplify assembly. For panels of different panel thickness, different disk elements can be provided whose axial rib height is matched to the panel thickness in question. The following applies here: The greater the panel thickness, the smaller the axial rib height. In this way, greater axial clearance of motion remains until the axial rib of the disk element is brought into pressure contact with the axial stop of the fastening element in order to provide a predefined clamping force. Conversely, the following applies: The smaller the panel thickness, the greater the axial rib height.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
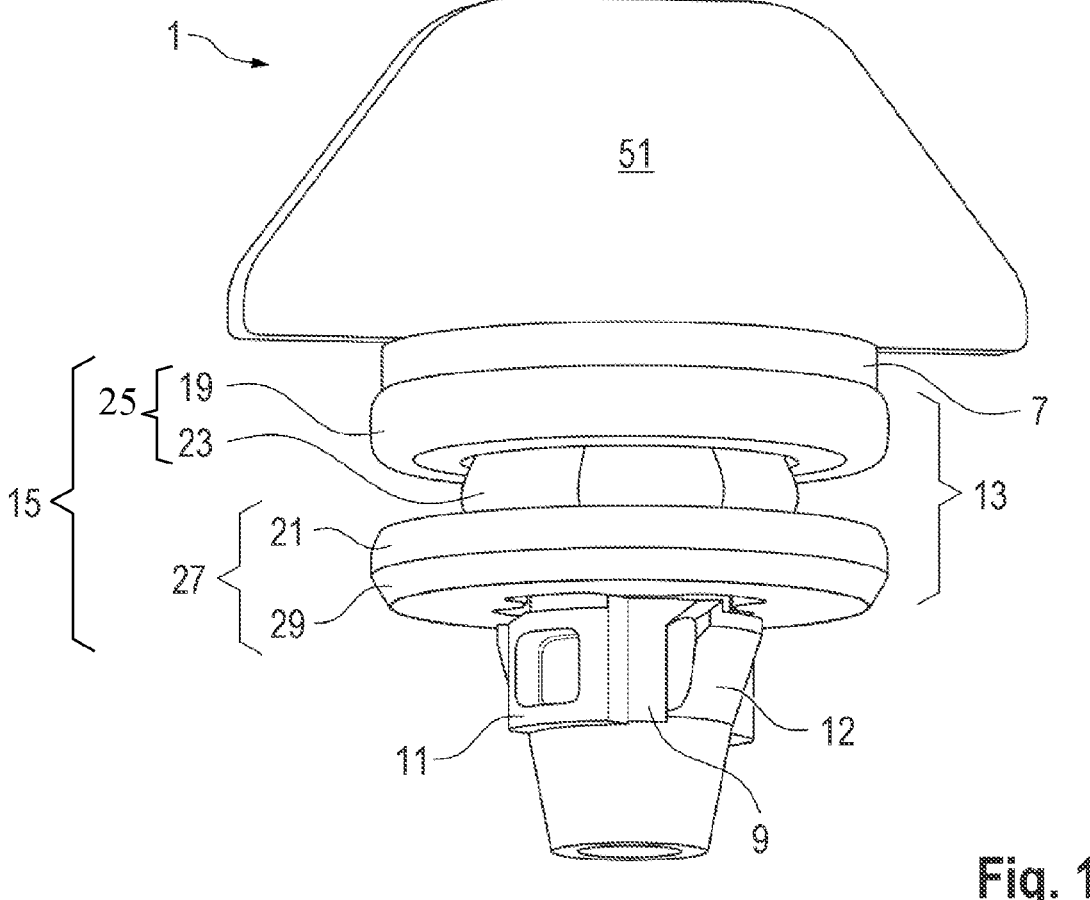
FIGS. 1 and 2 show different side views of a fastening element.
Figure 2:
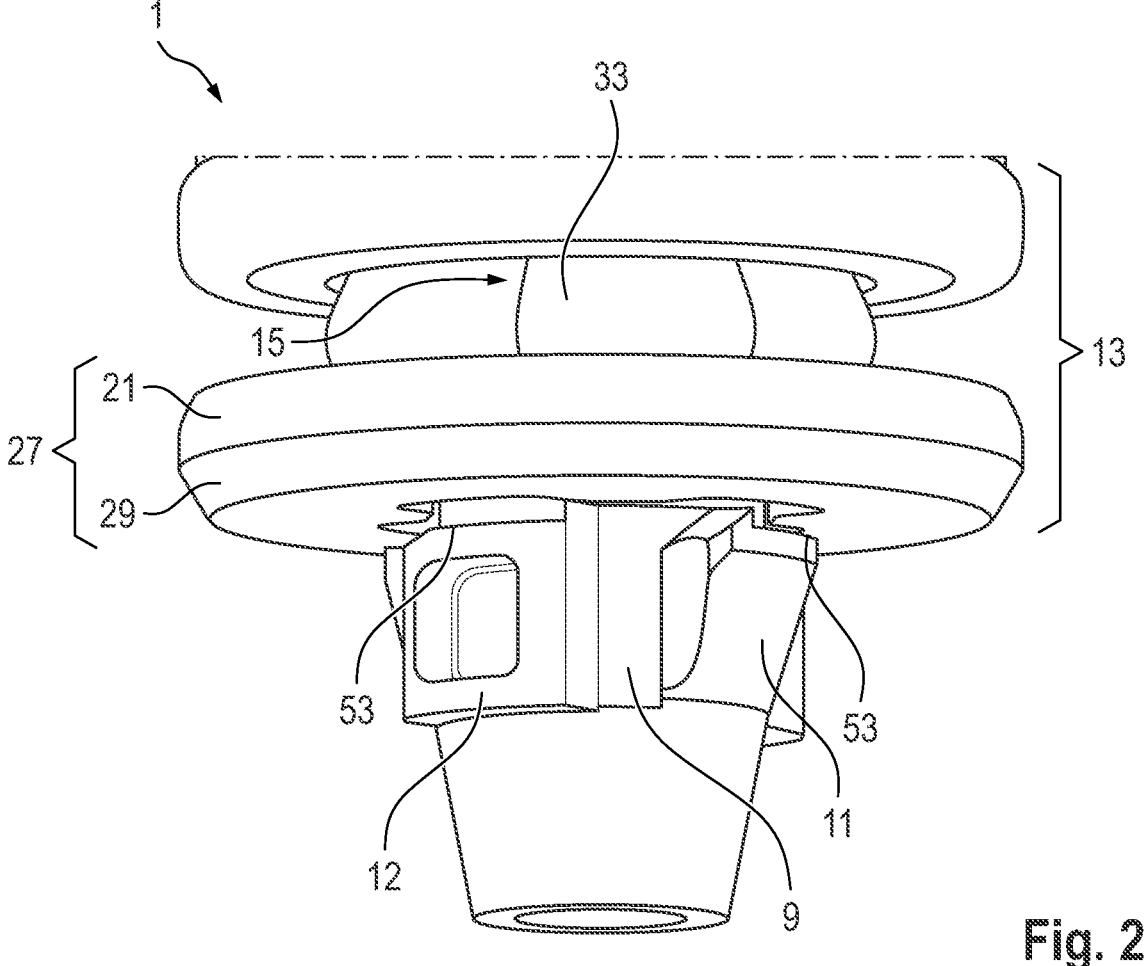
Figure 3:
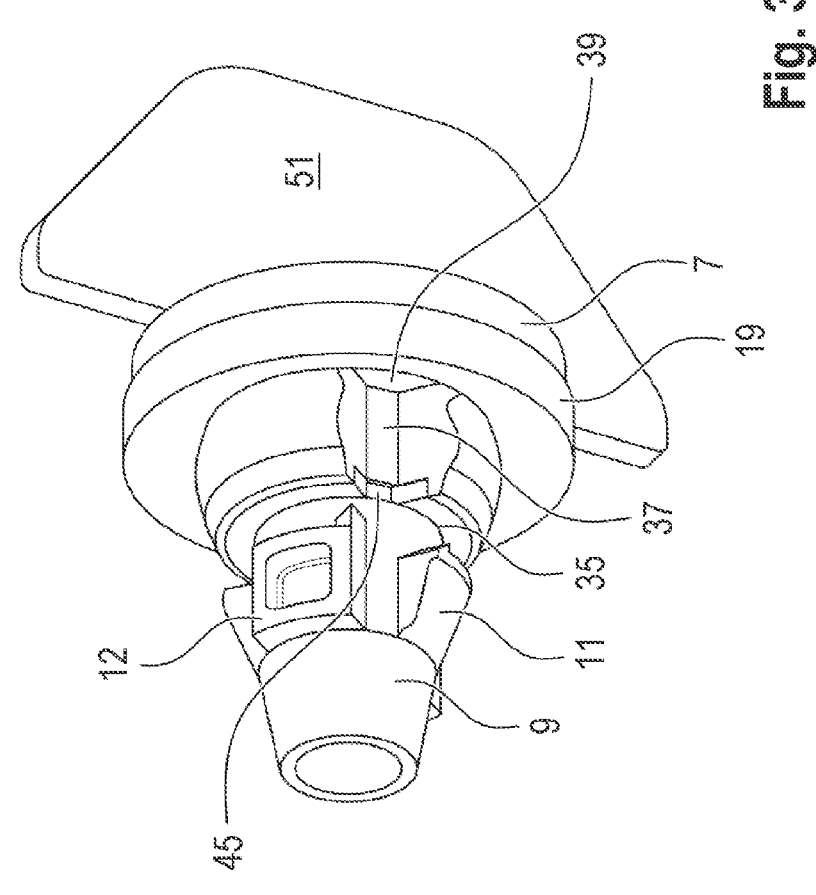
FIG. 3 shows the fastening element in an exploded view with disk element removed.
Figure 3:
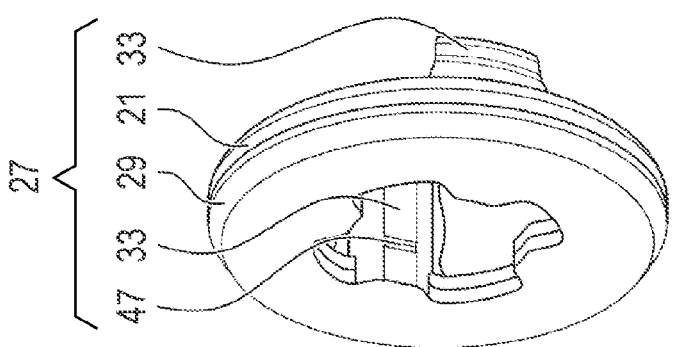
Figure 11:
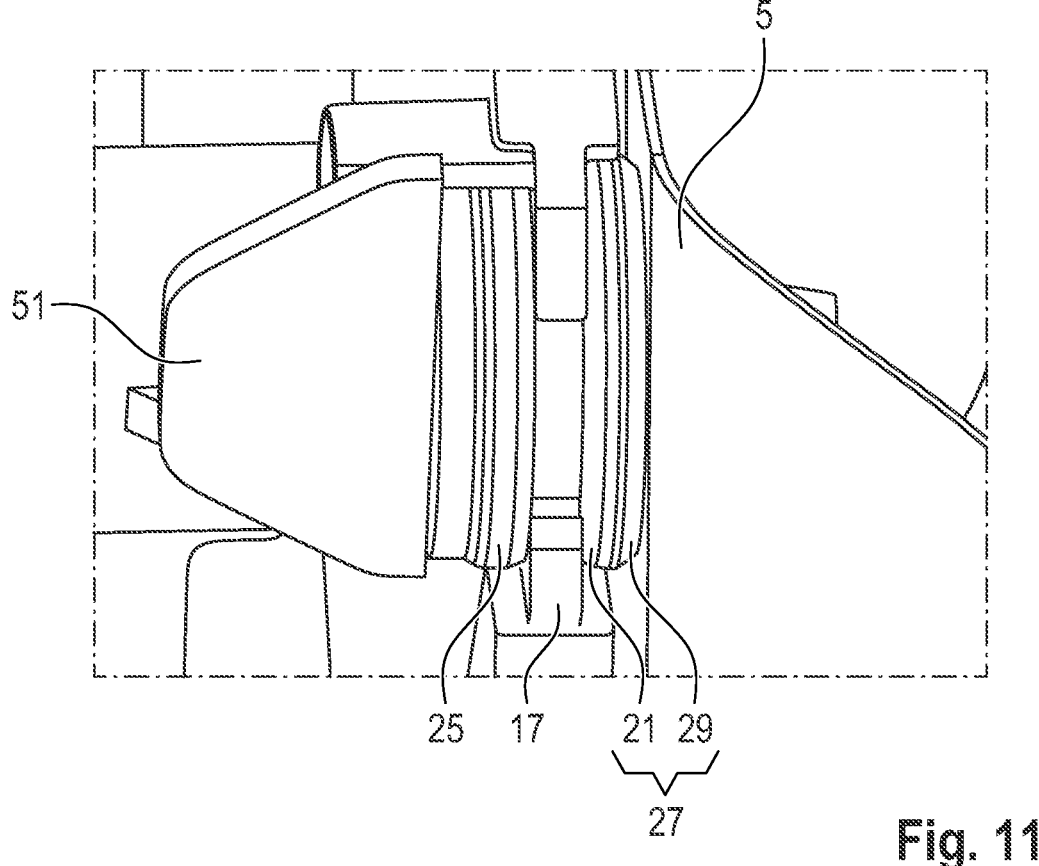

A fastening element 1 is shown in different views in FIGS. 1 to 3. With the aid of the fastening element 1, a bolt-on part 3 can be elastically connected to a body panel 5, as is indicated in FIG. 11. The fastening element 1, made of plastic, has an enlarged head section 7, which transitions into an element shank 9. Mounting bosses 11, 12, which project radially outward from the element shank 9, are formed in the region of an element shank tip. In addition, an elastomer profile part 13, with retaining groove 15 that is open radially to the outside, is arranged on the underside of the head section 7. A retaining foot 17 of the bolt-on part 3 can engage in the retaining groove 15. As is evident from FIG. 4 or 5, the retaining groove 15 is designed with a groove wall 19 on the head side, a groove wall 21 on the shank side, as well as a radially inner groove bottom 23.

Figure 4:
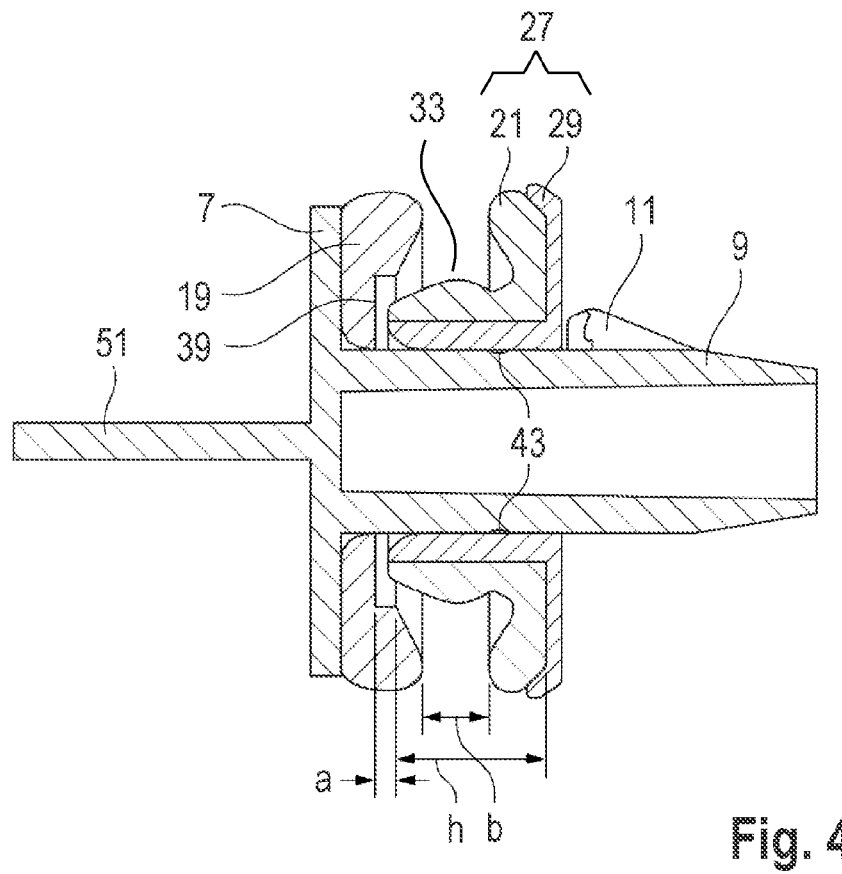
FIGS. 4 and 5 show different sectional representations of the fastening element.
Figure 5:
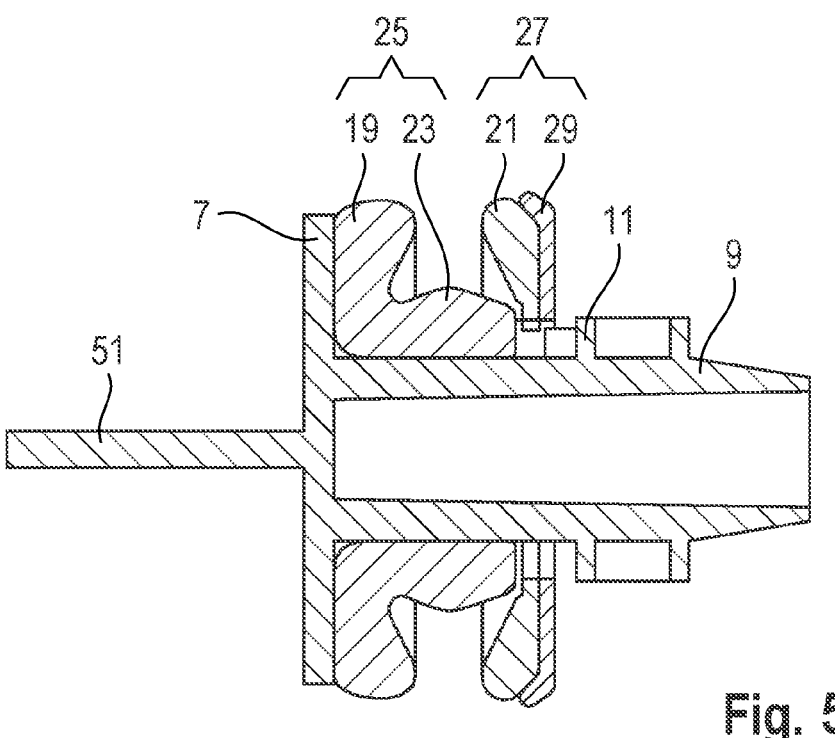

According to FIGS. 3-5, the elastomer profile part 13 is not made of a single material and as a single piece, but instead is constructed in two parts, namely with an elastomer body 25 arranged on the head section 7 of the fastening element 1, and with a disk element 27. The disk element 27 in FIGS. 4 and 5 is implemented as a two-component part, namely with the groove wall 21 made of elastomer material on the shank side, which constitutes the soft component, and a hard component 29 that faces the shank tip and is supported on the panel 5 in the final assembled state. In contrast, the groove wall 19 on the head side and the radially inner groove bottom 23 are formed in the elastomer body 25.

The disk element 27 is supported on the element shank 9 by means of an axial guide so as to be axially movable through a motion clearance a (FIG. 4). In this way, the disk element 27 can be moved easily in the axial direction in order to set a groove width b (FIG. 4) between the two opposite groove walls 19, 21.

In accordance with FIG. 3, the axial guide has the diametrically opposing axial ribs 33 formed on the inner perimeter of the disk element 27, which project axially by an axial rib height h (FIG. 4) from the inner perimeter of the disk element 27. It must be emphasized that each axial rib 33 is constructed in two parts, from the hard component 29 as well as from the elastomer material of the groove wall 21 on the shank side, as is evident from FIG. 4.

According to FIG. 3, the elastomer body 25 is fixed in position between the underside of the head section 7 and a collar 35 (FIG. 3) formed on the element shank 9.

Each of the axial ribs 33 of the disk element 27 is guided so as to be axially movable but rotationally fixed in an axial groove 37 (FIG. 3) located in the groove bottom 23 of the retaining groove 15. The respective axial groove 37 is designed in this case as a discontinuity in the elastomer material of the elastomer body 25. In addition, the axial groove 37 located in the groove bottom 29 of the retaining groove 15 has an axial stop 39 (FIG. 3) on the head side, which limits an axial movement of the disk element 27 toward the head section 7 in a final assembly process (described later), thereby limiting a pushing motion of the fastening element 1 in a mounting hole 41 of the panel 5 during the final assembly process.

As is further evident from FIG. 4, the disk element 27 is guided so as to be axially movable on the element shank 9 of the fastening element 1 by means of a retaining device 43. According to FIG. 3, the retaining device 43 has an axial groove 45 on the outer perimeter of the element shank 9 as well as a preliminary latching rib 47 that is formed on the inner perimeter of the disk element 27 and projects into the axial groove 45.

Figure 6:
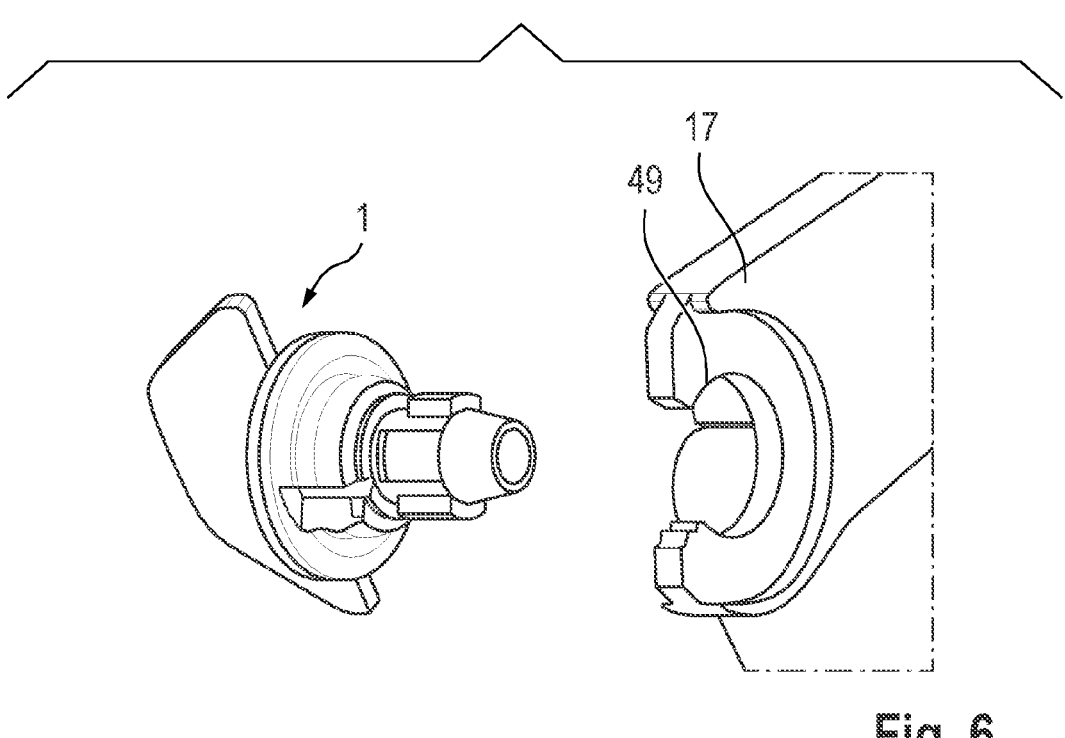
FIGS. 6 to 11 show views aiding the visualization of a process sequence for the assembly of a bolt-on part with a panel.
Figure 7:
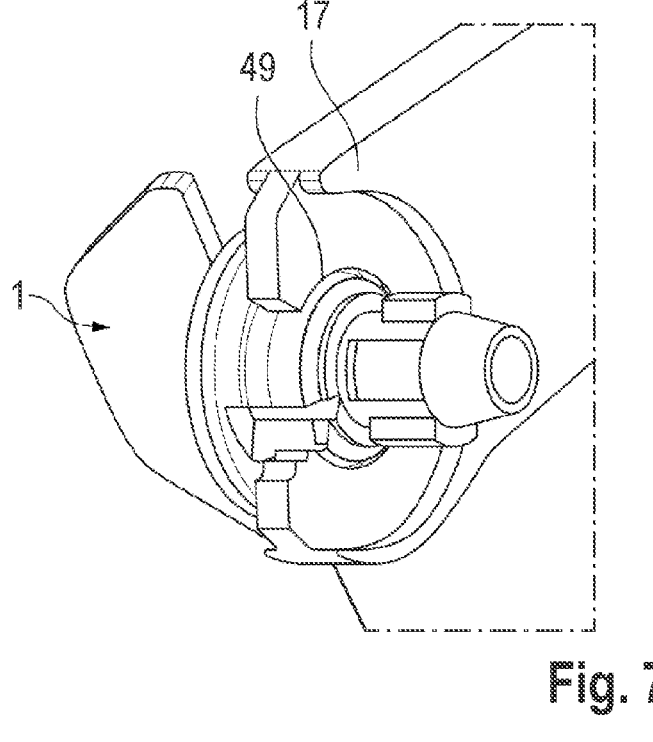
Figure 8:
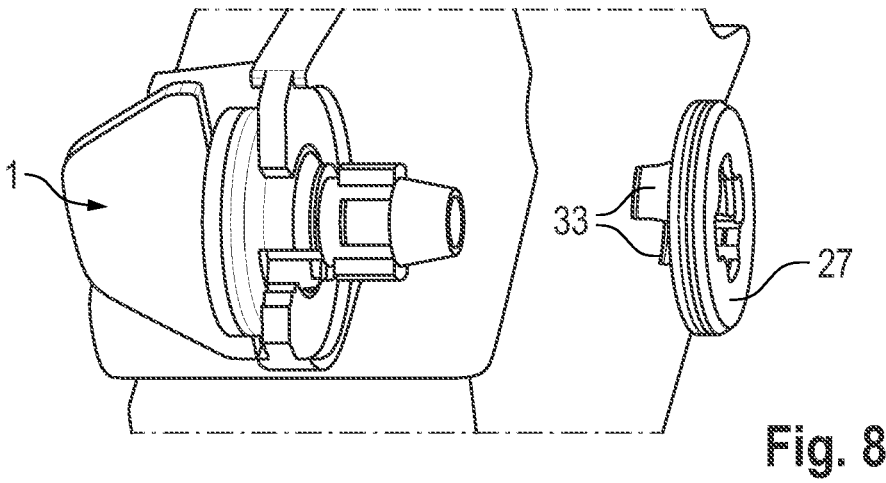

A preassembly process in which the fastening element 1 is preassembled on the retaining foot 17 of the bolt-on part 3 is described below on the basis of the attached FIGS. 6 to 8. Accordingly, as shown in FIGS. 6 and 7, the element shank 9 of the fastening element 1 is passed through a C-shaped mounting lug 49 of the retaining foot 17 of the bolt-on part 3 while the disk element 27 is still detached. After that, in accordance with FIG. 8, the disk element 27 is pushed onto the element shank 9 of the fastening element 1 until the preliminary latching rib 47 comes into loose latching engagement with the axial groove 45 located on the outer perimeter of the element shank 9, by which means the retaining device 43 is made ready. The preassembly process thus takes place without creating a stress.

Figure 9:
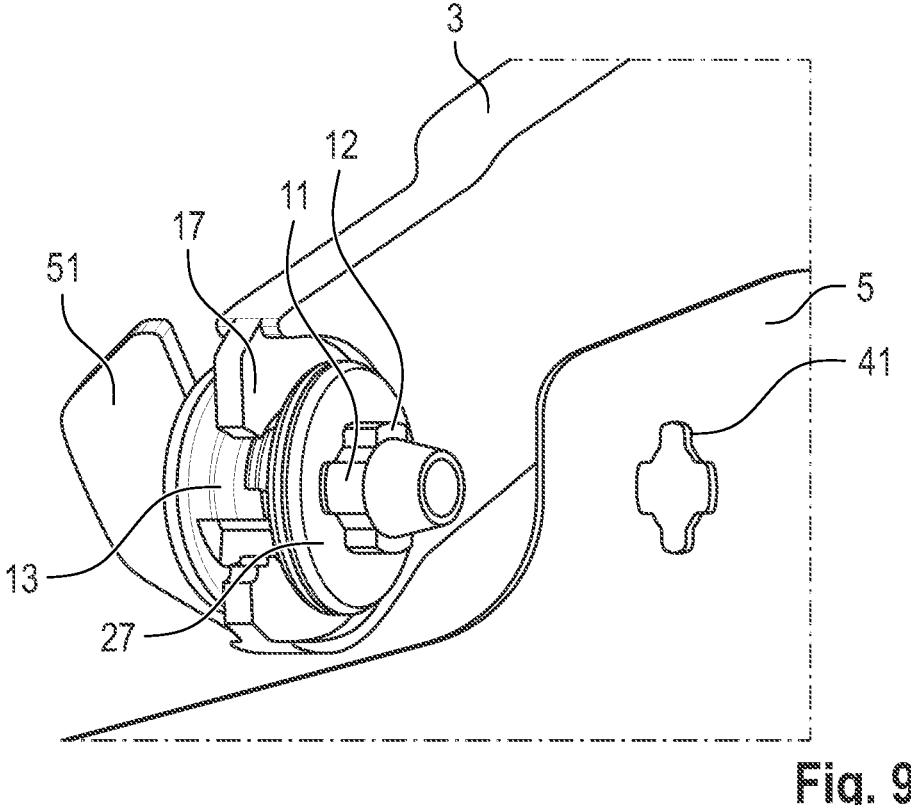
Figure 10:
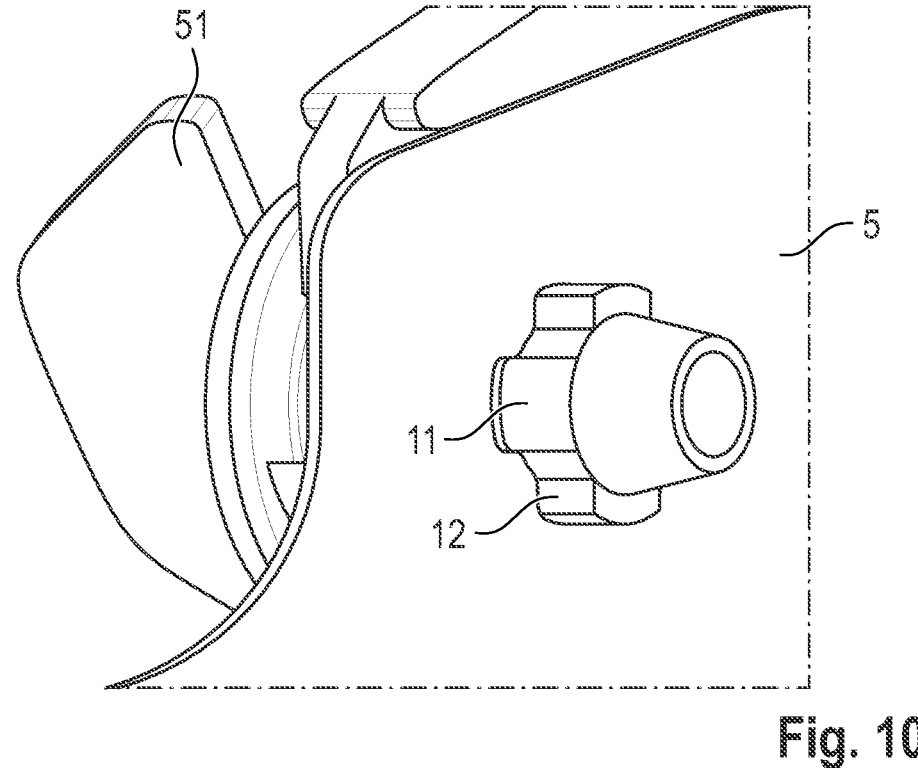

Subsequently, a final assembly process is carried out in accordance with FIGS. 9 to 11. The final assembly process is accomplished by means of a push/rotate actuation of the twist grip 51 formed on the head section 7. First, the element shank 9 of the fastening element 1 is passed through the mounting hole 41 of the panel 5 in a pushing direction, and then the fastening element 1 is rotated into the final assembly position in which the mounting bosses 11, 12 engage beneath an edge region of the opening of the mounting hole 41 of the panel 5. In the final assembly position, the head section 7 presses the two-piece elastomer profile part 13 against the panel 5, creating an elastic preloading, so that the retaining foot 17 of the bolt-on part is elastically preloaded in the axial direction. Moreover, the edge region of the opening of the mounting hole 41 of the panel 5 is clamped between the disk element 27 of the fastening element 1 and an upper side 53 of the mounting bosses 11, 12 with a predefined clamping force in the final assembly position. The component geometry of the bosses corresponds to the component geometry of the bosses disclosed in DE 10 2013 011 878 A1.

Furthermore, in the final assembly position, the axial ribs 33 of the disk element 27 are guided into pressure contact with the axial stop 39 of the fastening element 1, using up the axial clearance of motion a. Consequently, the disk element 27 is supported by its axial ribs 33 on the axial stop 39 of the fastening element 1, by which means the disk element 27 presses the edge region of the opening of the panel 5 against the upper side 53 of the mounting bosses 11, 12 with a predefined clamping force.

The fastening element 1 according to the invention can be provided for panels 5 of different panel thickness. For this purpose, different disk elements 27 can be provided whose axial rib height h is matched to the panel thickness in question. The following applies here: The greater the panel thickness of the panel 5 is, the smaller the axial rib height h is. Conversely: The smaller the panel thickness of the panel 5 is, the greater the axial rib height h is, in order to achieve the predefined clamping force by supporting the disk element axial ribs 33 on the axial stop 39 of the fastening element 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fastening arrangement comprising:

a fastening element to elastically connect a bolt-on part to a support part or a panel, the fastening element having a head section that transitions into an element shank; and an elastomer profile part with a retaining groove that is open radially to an outside, into which a retaining foot of the bolt-on part is adapted to engage, is arranged on an underside of the head section, wherein the retaining groove has a groove wall on the head side and a groove wall on a shank side with a groove bottom located therebetween, wherein the elastomer profile part is constructed in at least two parts from that include an elastomer body and a disk element, wherein the elastomer body is arranged on the head section of the fastening element and includes the head side groove wall and the groove bottom, the groove bottom protruding from a surface of the head side groove wall in a direction towards the shank side groove wall, and wherein the disk element includes the shank side groove wall.

2. The fastening arrangement according to claim 1, wherein in a final assembly position, the head section presses the elastomer profile part against the panel with elastic preloading so that the retaining foot of the bolt-on part is elastically preloaded.

3. The fastening arrangement according to claim 1, wherein the disk element is supported on the element shank so as to be axially movable through a motion clearance.

4. The fastening arrangement according to claim 3, wherein at least one axial rib projects axially from an inner perimeter of the disk element, the at least one axial rib being guided in an axial groove located in the groove bottom of the retaining groove so as to be axially movable but rotationally fixed, and wherein the axial groove is designed as a discontinuity in an elastomer material of the elastomer body.

5. The fastening arrangement according to claim 4, wherein the axial groove located in the groove bottom of the retaining groove terminates on the head side with an axial stop that limits an axial movement of the disk element toward the head section.

6. The fastening arrangement according to claim 5, wherein, in a final assembly position, the axial rib of the disk element is guided into pressure contact with the axial stop of the fastening element on which the disk element is supported, utilizing the motion clearance in order to press the support part against an upper side of a mounting boss of the element shank with a predefined clamping force, and wherein the motion clearance is greater than 0.

7. The fastening arrangement according to claim 1, wherein the disk element is secured on the fastening element by a retaining device, and wherein the retaining device includes a latching rib formed on an inner perimeter of the disk element and an axial groove formed on an outer perimeter of the element shank, wherein the latching rib projects into the axial groove.

8. The fastening arrangement according to claim 1, wherein the disk element is designed as a two-component part that includes the shank-side groove wall that is made of an elastomer material, and a second component that faces a shank tip and is supported on the support part in a final assembly position, wherein the second component is formed of a harder material than the shank-side groove wall.

9. The fastening arrangement according to claim 1, wherein the fastening element has, on the shank tip of the element shank, at least one mounting boss that projects radially outward from the element shank and engages with an opening of the support part, and wherein an edge region of the opening of the support part is clamped between the disk element and an upper side of the at least one mounting boss in a final assembly position by the axial preloading.

10. The fastening arrangement according to claim 1, wherein the head side groove wall and the groove bottom are formed as a single, monolithic element.

* * * * *